United States Patent

Carroll et al.

[15] 3,640,234

[45] Feb. 8, 1972

[54] FUMIGANT INJECTION APPARATUS

[72] Inventors: William J. Carroll, West Lafayette, Ind.; Frank S. Mizusawa, Garden Grove, Calif.

[73] Assignee: Great Lakes Chemical Corporation, West Lafayette, Ind.

[22] Filed: May 1, 1970

[21] Appl. No.: 33,709

[52] U.S. Cl. ............................................................. 111/6
[51] Int. Cl. ......................................................... A01c 23/02
[58] Field of Search .................................. 111/7.1–7.4, 1, 111/6; 175/394, 17; 61/53.52, 53.64, 56.5

[56] References Cited

UNITED STATES PATENTS 2,890,860   6/1959   Smith .................................. 175/394 X
3,071,200   1/1963   Kuhl .................................... 111/7.2 X
3,394,667   7/1968   White ........................................ 111/6

FOREIGN PATENTS OR APPLICATIONS 1,112,954   5/1968   Great Britain ............................ 111/6

*Primary Examiner*—Robert E. Bagwill
*Attorney*—Gordon W. Hueschen, Talivaldis Cepuritis and A. David Spevack

[57] ABSTRACT

A system is disclosed for forming, filling and sealing capsules of volatile fumigant at least 3 feet underground. The system utilizes an apparatus which penetrates to the prescribed depth, forms a cavity at that depth, fills the cavity and withdraws sealing the filled cavity encapsulating the fumigant at the prescribed depth. The apparatus is particularly useful in combating pathogenic fungi such as *Armillaria Mellea*.

6 Claims, 8 Drawing Figures

INVENTOR.
FRANK S. MIZUSAWA
WILLIAM J. CARROLL
BY
ATTORNEYS

INVENTOR.
FRANK S. MIZUSAWA
WILLIAM J. CARROLL

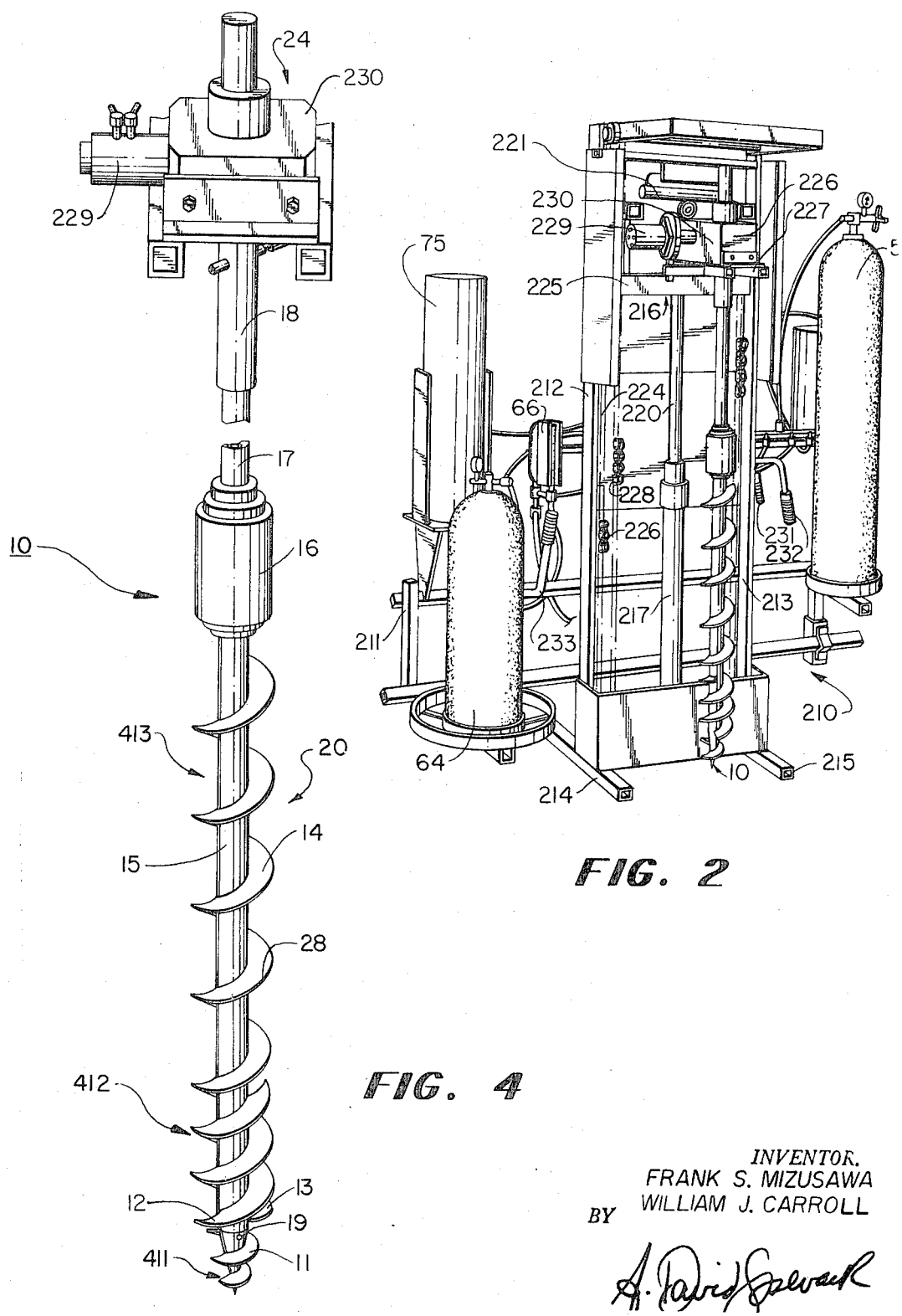

3,640,234

FUMIGANT INJECTION APPARATUS

This invention pertains to a system used in agriculture to implant volatile fumigants in the earth. The invention also pertains to an apparatus which is used to drill, fill and seal capsules of volatile fumigants into the soil.

BACKGROUND OF THE INVENTION

Many thousands of acres of arable land are rendered useless by various forms of pathogenic soil fungi. Various systems and apparatus have been devised for combating these soil fungi by injecting fumigant agents into the upper layers of the coil (depths up to about 1–2 feet); also by spraying the agent on the soil surface and then sealing the fumigant against the soil by the use of tarpaulins and foams or by combinations of these methods. These techniques have been inadequate in combating certain pathogenic fungi which cause great damage to trees by causing various types of root rot. The root rot diseases such as oak root fungus caused by *Armillaria Mellea*, Black rot caused by *Dematophora* fungus and other similar maladies wreak great harm on orchards, vineyards, arbors and other planned broad leaf plant growing areas. Surface and upper subsurface methods of treatment used to date to treat these fungi diseases have been inadequate because the agents fail to penetrate the soil sufficiently to destroy the disease and because the agents, if applied in quantities cause damage to plant and tree root structure. In order to properly treat these fungi diseases it is necessary to penetrate the soil to at least 6 or 7 feet below the soil surface and maintain a fungicidal concentration of agent for a sustained period of time.

Our copending application "Deep Implantation Method of Controlling Soil Fungi" filed of even date describes a method of controlling these pathogenic fungi by encapsulating quantities of volatile fumigant at least 3 feet below the soil surface, more preferably between 4 to 6 feet below the surface. It was surprising to find that when the fumigant, particularly methyl bromide, is implanted at this depth a surprisingly large zone of fungicidal concentration of agent is created and maintained in the soil than is expected from previous experience with surface and upper subsurface application of the agent. Not only is there a deep penetration of material but an extremely broad lateral penetration of material. By means of this deep implantation method it is possible to clear the fungus infestation from the desired area.

Various types of apparatus and systems have been previously used to inject agents of various kinds in the soil.

U.S. Pat. No. 3,397,542, issued Aug. 20, 1968, describes an apparatus for, and claims a method of, treating subsurface soil. The apparatus is basically a truck mounted hydraulic ram. Sections of conduits are forced into the earth and then slurry tanks are attached to the conduits and soil stabilizing agents are then pumped into the soil. The conduits are pulled out at a later time. Except for blockage caused by the soil stabilizing agents the conduits are in open communication with the surface at all times.

U.S. Pat. No. 3,109,393, issued Nov. 5, 1963, describes and claims "Lawn Aerating and Fertilizing Machine" which has a number of small earth augers which bore a number of shallow holes into the upper soil surface and fill these holes with granulated fertilizer. By the very nature of the purpose of the apparatus these holes are only into the turf layer of the soil and are in open communication with the surface.

U.S. Pat. Nos. 2,809,469 and 2,759,300, issued Oct. 15, 1957 and Aug. 21, 1956, respectively claim a device for introducing a predetermined amount of insecticide beneath the soil surface. The device described in each of these patents is a formulation of insecticide (a different formulation in each patent) which is hardened into the base of a wire or plastic shaft designed to be thrust into the soil. Although the depth of penetration is not specified it is obvious that even under the most ideal conditions only penetration of the upper soil surface is possible.

There are various tractor pulled devices used in a well-known manner in agriculture which inject fumigant agents into the upper soil surface down to a depth of 8 to 24 inches such as soil injection equipment, tarp fumigation equipment, deep injection subsoil fumigation units, nontarpable, plowing, etc.

It is therefore an object of this invention to provide a system of injecting and sealing quantities of fumigants deep into the soil.

It is a further object of this invention to provide a system which is rapid in its application.

An additional object of this invention is to provide an apparatus which can encapsulate volatile fumigants deep into the soil.

Another object of this invention is to provide an easily movable apparatus for the implantation of fumigants in the soil.

Yet another object of this invention is to provide an apparatus which is simple to operate.

Other objects and advantages of this invention will become apparent in the following description.

SUMMARY OF THE INVENTION

This invention contemplates a system suitable for the deep implantation of volatile fumigants which provides an injection means capable of penetrating to the desired depth. A feed means is separably connected to the injector capable of delivering a predetermined amount of fumigant agent into the ground through the communicating conduits and injector. The system also contains a reservoir of soil fumigant agent for refilling the feed means. The injector is engaged in a drive means capable of providing the system with a four-phase cycle of:

1. Penetration phase wherein said injection means penetrates into the earth to a prescribed depth to form a passageway therein;
2. Chamber phase wherein said injection means together with the lower portion of the passageway produced in the soil in phase 1 forms a closed subterranean chamber;
3. Filling phase wherein fumigant from said reservoir is introduced into said chamber through said feed means and said injection means; and
4. Encapsulating phase wherein said injection means withdraws, thereby sealing the penetration passageway.

BRIEF DESCRIPTION OF DRAWINGS

FIG. 2 is a front perspective view of the apparatus.
FIG. 4 is an enlarged detail of the drill bit.

DESCRIPTION OF THE PREFERRED EMBODIMENTS

The invention contemplates a system of implanting volatile fumigants into the soil by using an injection means which is capable of penetrating at least 3 feet into the soil. A feed means containing measuring devices are separably connected to both the injection device and a fumigant reservoir. The system has a four-phase cycle of operation. In the first phase the injection device drives into the earth to the prescribed depth. In the second phase a chamber is formed underground. In the third phase the chamber is filled with the volatile fumigant agent, and in the fourth phase the injection device is withdrawn while simultaneously sealing the penetration passageway.

The invention in the simplest mechanical embodiment encompasses an injector which is an auger bit so designed that it can be mounted in standard agricultural drilling equipment, connected to suitable fumigant sources and function to operate the system of this invention.

The invention further contemplates an apparatus for injecting fumigants into the soil which is portable and can be tractor mounted.

The tractor mounted apparatus has a mobile support which carries vertically disposed members on which are mounted a movable mounting assembly. The support also carries a fumigant reservoir and feed system including measuring devices. A drill head with helicoidal-shaped, rotatable bit dependent therefrom is mounted on the mounting assembly. A drive mechanism controls both the drill bit and mounting assembly thereby giving a four-phase cycle of operation described above. The orifices located at the base of the bit are connected by means of a conduit axillary disposed within the bit to a coupling device mounted on the upper portion of the bit.

Any of the well-known volatile fumigant agents or combinations of these agents, may be employed in the system and apparatus of this invention. These agents include the volatile sulfur-based fungicides such as carbon bisulfide, the volatile halo hydrocarbonyl fungicides such as methyl bromide, dichloropropene, ethylene dibromide, and chloropicrin. It is most preferred to use methyl bromide, either untreated or in gel form.

Now having generally described the system and apparatus of this invention, reference is made to the drawings to describe a specific embodiment of the invention which is illustrative of the system and apparatus when methyl bromide is used as the fumigant.

Figure 1:
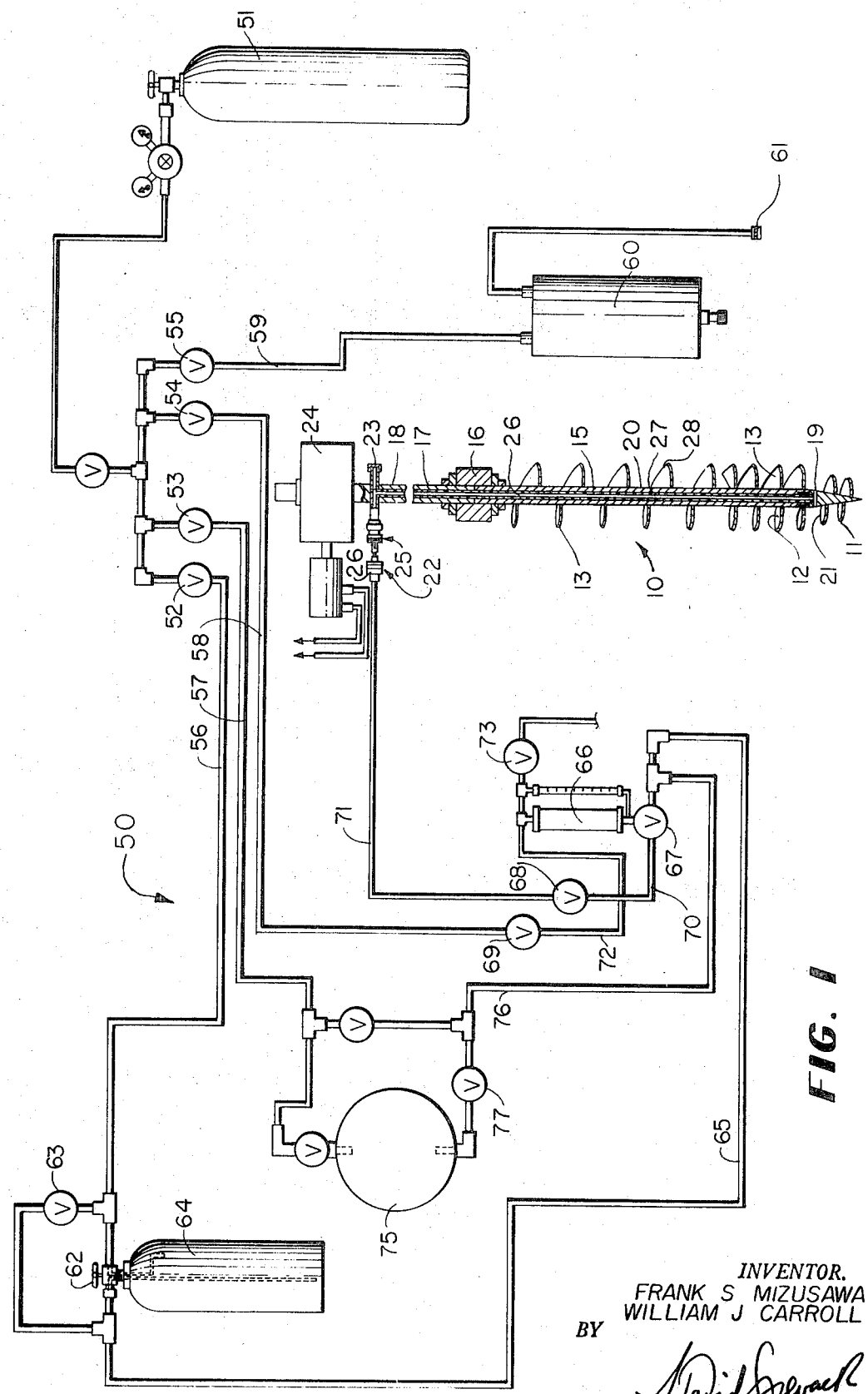
FIG. 1 is a schematic view of the injection system.

Referring now to the drawing, FIG. 1 shows the general schematic plan of the injection system. The injector 10 is provided with a tip 411 having at least one ejection port. A conduit 26 is positioned axially in the injector 10. The conduit 26 terminates in a quick coupler assembly 22. The coupler assembly 22 comprises a male plug 26 and female socket 25. When the quick coupler assembly 22 is connected to the fumigant feed means 50, methyl bromide can be fed to the ground.

The fumigant feed system 50 is selectively pressurized by an inert gas, preferably nitrogen, which is fed from tank 51 under the control of needle valves 52, 53, 54, and 55 into conduits 56, 57, 58 and 59. Valve 55 and conduit 59 permit the pressurization of water tank 60 thereby forcing water through hose connection 61 when said connection is connected to wash out connection 23 to flush conduit 26 and ports 19 and 21.

Valve 52 allows nitrogen to flow through conduit 56. When tank valve 62 is opened and bypass valve 63 closed, methyl bromide flows from tank 64 through conduit 65 and into dispenser 66 through valve 67.

Valve 67 is a two-way valve. When valve 68 is closed, valve 67 is opened to allow the filling of dispenser 67. When the desired amount of methyl bromide is filled into the dispenser 66, valve 62 is closed and valve 63 is opened and conduit 65 is flushed of any residual methyl bromide. The quantity of agent held in dispenser 66 is discharged by opening valve 68. The opening of valve 68 automatically switches valve 67 to allow the agent to flow into conduit 70 while closing conduit 65. At the same time the opening of valve 68 opens valve 69 allowing nitrogen pressure to flow through conduit 72 from needle valve 54 and force the agent out of dispenser 66 through valves 67 and 68 and conduit 70 and 71 into conduit 26 in injector 10 and finally into the ground. The closing of valve 68 reopens valve 67 to the filling apparatus and closes valve 69. Valve 73 is a breather valve.

The dispenser 66 is any of the usual metering devices used in the handling of volatile fumigants which allow for the holding and measuring of fumigant agents.

When it is desired to retard the evaporation rate of the fumigant agent, a methyl bromide gel is used in place of methyl bromide liquid by feeding propellant from valve 53 through propellent line 57 to methyl bromide gel reservoir 75 where a methyl bromide gel is then fed through gel chemical line 76 under the control of valve 77 to dispenser 66 in a similar manner to that used with methyl bromide itself.

Figures 5A, 5B, 5C, 5D:
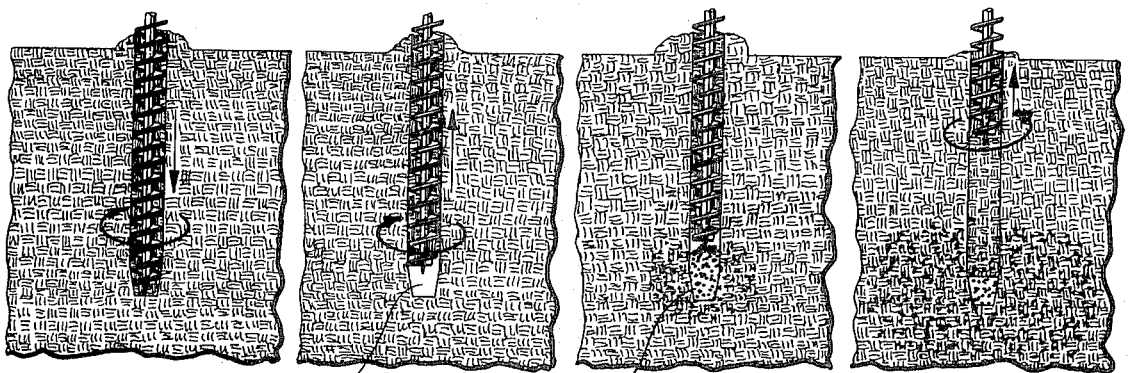
FIGS. 5a, b, c, and d are sectional views taken through the earth of the device in operation.

In operation the injection system has a four-phase cycle illustrated in FIGS. 5a, b, c, and d.

The first phase is a penetration phase where the injector penetrates to the prescribed depth of at least 3 feet, preferably 5 feet into the soil. This is illustrated in FIG. 5a. The second phase illustrated in FIG. 5b, is a chambering phase wherein the injector forms a closed subterranean chamber by continuing a clockwise rotation while auger 20 is raised. Phase three illustrated in FIG. 5c is a filling phase where the coupling 22 is joined and valve 68 is opened thereby allowing the fumigant in the dispensing device 66 to be discharged into the subterranean chamber 550. The fourth is an encapsulating phase illustrated in FIG. 5d wherein the injector is withdrawn simultaneously sealing the penetration passage.

Structurally injector 10 is provided with an auger section 20, extension shaft 17 and collar chuck 18. Auger 20 comprises a collar 16 and shaft 15 with blades 11, 12, 13, and 14 to cut into the soil. Referring to FIG. 4, auger section 20 has three blade zones 411, 412, and 413. Tip 411 has blade 11 which is a helix having a rather low pitch. Tip 411 makes the initial contact with the unbroken soil and must establish the forward drive of auger section 20. The tip 411 is so designed that it will not "jam up" when it hits an impenetratable object but will continue to rotate until the object can be overridden or bypassed. Zone 412 is a cutting-conveyor zone comprising double helix blades 12 and 13 starting 180° apart. Blades 12 and 13 cut into the soil widening the initial zone of broken ground made by tip 411. Cutting-conveying zone 412 breaks the soil into small particles and conveys the soil upward to zone 413 thereby forming a passageway. Conveying storage zone 413 comprises a single helic blade 14 which has a relatively steep pitch. Zone 413 rapidly moves soil upward or downward (depending on the direction of rotation) or can hold large quantities of soil between the turns of blade 14 thereby sealing the passageway. A beading 28 is provided along the edge of blades 11, 12, 13 and 14 so as to raise a lip along the edge of these blades which turns inward. The turn of the beading 28 can be seen in FIG. 1. The beading 28 causes the earth to be forced inward toward shaft 15 and thereby packing auger 20 to form a plug in the soil. Shaft 15 terminates in collar 16 which provides a means of connecting the auger section 20 to extension shaft 17. Extension shaft 17 is removable and the depth of penetration is varied by changing the length of extension shaft 17. Extension shaft 17 is locked into collar chuck 18 which is itself mounted in the drive means 24. Collar chuck 18 is provided with part 25 of quick coupler 22. Part 25 communicates with conduit 26 axially located in injector 10. Conduit 26 communicates from exhaust ports 19 and 21 located just above the junction of tip 411 and cutter conveyor 412 up to the quick coupler 22. When injector 10 is fully assembled, conduit 26 is continuous. It is essential to the operation of the invention that whatever changes are made in extension shaft 17 or other parts, that there be a clear passage 26 open through the injector 10 when assembled. Each part of the injector is provided with an axial conduit which cooperates with the next part to form said conduit. Conduit 26 is preferably lined with a nonreactive lining 27. The nonreactive lining 27 is preferably a plastic corrosion resistant material such as polyethylene, polypropylene and the like or a fluorinated hydrocarbon such as Teflon. All valve fittings, couplings and other parts should be made of material which will not interact with the fumigant materials. Washout connection 23 is provided to allow for the connection of a water hose or the like to be connected to injector 10 in order to clean out conduit 26 and ports 19 and 21.

Injector 10 can be mounted in a standard post hole digger (not illustrated) and the depth of implantation controlled by the length of extension shaft 17.

Figure 3:
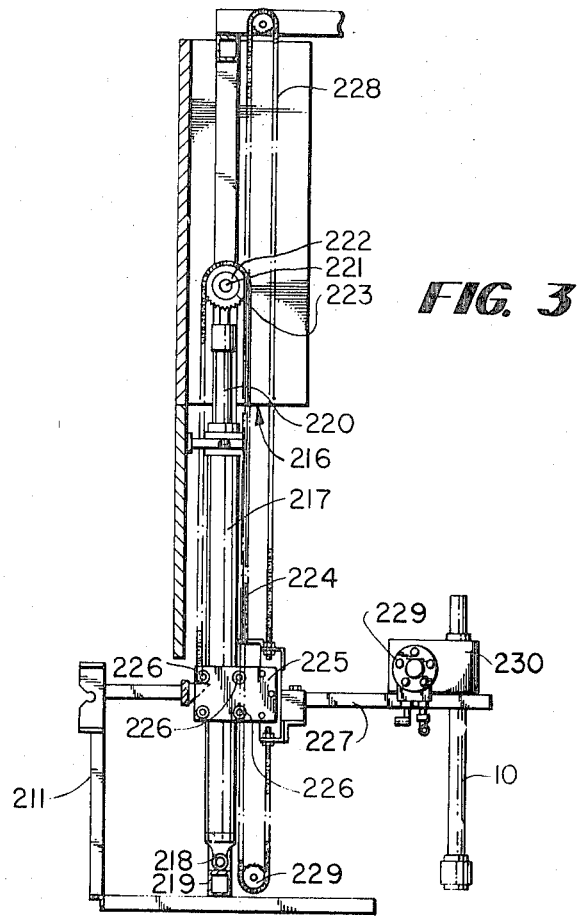
FIG. 3 is a side elevation of the apparatus.

In one embodiment of the invention the injector 10 is mounted in the drilling apparatus illustrated in FIGS. 2 and 3.

Referring now to FIGS. 2 and 3 the apparatus 210 is mounted in the rear of a tractor (not illustrated) by means of A-frame and tool bar rig 211 which is the mobile support for the apparatus. Power to operate the apparatus is derived from the "power takeoff" of the tractor which operates a hydraulic pump (not illustrated). The apparatus has two vertically disposed members 212 and 213. Retractable stability supports 214 and 215 are movably attached at right angles to the vertical members 212 and 213 so that they can contact the ground giving added stability to the apparatus when the apparatus is in operation and also so they can be raised to a travelling position when the apparatus is moved from one area to another. An elevator system 216 is movably mounted on the vertical members 212 and 213. The elevator system 216 comprises a hydraulic cylinder 217 which is attached at its base 218 to a lateral support 219. The piston 220 of the cylinder 217 is attached to a horizontal bar 221. The horizontal bar 221 is movably mounted on the vertical members 212 and 213 by means of guide wheels 222. Rotatably mounted on the bar 221 are sprocket wheels 223. Chains 224 are in operable connection with sprocket wheels 223 and are attached to the frame 211 at one end and a mounting panel 225 at the other end. The mounting panel 225 is movably attached to vertical members by the guide roller assembly 226. The movement of the piston 220 imparts an up and down movement of bar 221 which by operation of the sprocket wheels 223 and chains 224 imparts an up and down movement to the panel assembly 225. A drill head 226 is attached to the mounting panel 225 by means of support 227. A second set of chains 228 are attached to the top and bottom of panel 225. Chains 228 provide added support system and give added stability to the panel 225 and keeps the panel and the units mounted on the panel in proper alignment. The drill head is provided with a hydraulic motor 229 and gear box 230. Motor 229 is operated from the same hydraulic pump that operates the hydraulic cylinder 217. The depth of penetration is controlled by the length of chains 224 and extension shaft 17. When the length of shaft 17 is changed chains 224 must be adjusted accordingly.

The injector 10 is rotatably mounted in gear box 230 and can be rotated in either direction. Handles 231 and 232 operate the direction of rotation and the raising and lowering of elevator system 216.

Handle 233 controls valve 68 and as previously described also controls valves 67 and 69 so as to discharge a charge of agent from dispenser 66.

The operation of the apparatus is illustrated by reference to FIGS. 1, 2 and 5. It is the purpose of this apparatus to encapsulate or seal a quantity of methyl bromide or other volatile fumigant at least 3 feet and preferably 5 feet below the soil surface so that the fumigant can diffuse through the soil and control pathogenic fungi which cause root rot diseases, particularly oak root fungus caused by *Armillaria Mellea*. It is surprising to find that when the fumigant is placed at this depth with access to the surface limited to natural diffusion, the fumigant will permeate the soil for a very broad area laterally and vertically from the encapsulation point in a fungi-controlling concentration without causing injury to the existing root systems of nearby trees. In operation the tractor carrying the apparatus, as illustrated in FIGS. 2 and 3, is moved to the selected injection point. The supports 214 and 215 are put in place. The elevator system 216 is moved downward while the injector 10 is rotated in a clockwise direction thereby penetrating the soil to the selected depth as illustrated in FIG. 5a. A subterranean chamber 550 is then formed by moving the elevator system 216 upward about 6 inches while continuing to rotate the injector 10 in a clockwise direction as illustrated in FIG. 5b. The chamber 550 is then filled by attaching the quick coupler 22 and the operating handle 233 to open valve 68 thereby feeding a measured amount of fumigant from dispenser 66 into the chamber 550. The valve 68 is then closed and the quick coupler is detached. On injection, the fumigant starts to diffuse immediately as illustrated in FIG. 5c. Fumigant cannot escape upward because injector 10 acts as a plug beside providing a passage for agent into the ground. The quick coupler 22 is a one-way valve. The elevator system 216 is then moved upward while rotating the injector 10 counterclockwise. This causes the soil previously displaced to be packed down on to the chamber 550 encapsulating the fumigant under the soil surface. The soil is packed into the passage in about the density it previously had. The supports 214 and 215 are then raised and the apparatus moved to the next site where the process is repeated.

Although the invention has been particularly disclosed using methyl bromide and a hydraulic drive system it is to be understood that the invention is applicable to other volatile fumigants and other drive systems including the post hole digger. It is also obvious to one of ordinary skill in the art that the foregoing is presented by way of example only and the invention is not to be unduly restricted thereby since modification may be made in the apparatus without departing from the spirit of this invention.

We claim:
1. A soil fumigant injection apparatus comprising:
   a. a mobile support;
   b. a vertically disposed track member mounted on said support;
   c. a mounting assembly movably secured to said vertically disposed track member and capable of up and down movements;
   d. a volatile soil fumigant storage and feed means mounted on said support;
   e. a drill having a helicoidal-shaped, rotatable bit dependent therefrom;
      1. at least one exhaust orifice disposed on the lower portion of the bit;
      2. a conduit axially disposed within said drill and in communication with said orifice; and
      3. a coupling means associated with said drill and in communication with said axial conduit thereof, said coupling providing a separable connection to said fumigant feed means
   f. means mounting said drill on said mounting assembly; and
   g. means for rotating said drill:
      1. in a direction that when the mounting assembly is lowered the drill bit will displace earth upwardly to form a closed passageway in the soil;
      2. in a direction that when the mounting assembly is only partially raised the drill bit will form a sealed cavity in the earth that can be filled with fumigant from the feed means through the coupling, drill conduit and orifice in said drill bit; and
      3. in a direction that when the mounting assembly is further raised the bit will replace the displaced earth and thus seal the passageway previously formed, thereby creating a sealed capsule of fumigant in the soil.

2. A system suitable for the implantation of volatile fumigants into soil comprising:
   a. injection means comprising a rotatable auger having an axial conduit and exhaust orifice communicating with said conduit therein, said auger being capable of penetrating into the soil
   b. feed means in communication with said injection means
   c. a reservoir in communication with said feed means and adapted to contain soil fumigant, and
   d. drive means interconnected with said injection means and providing means for rotating said auger:
      1. in a direction that when the auger is lowered it will displace earth upwardly to form a closed passageway in the soil
      2. in a direction that when the auger is only partially raised it will form a sealed cavity in the earth that can be filled with fumigant through the injection means, and
      3. in a direction that when the auger is further raised it will replace the displaced earth and thus seal the passageway previously formed, thereby creating a sealed capsule of fumigant in the soil,
   wherein said auger comprises from bottom to top
      i. a tip section having a single helix blade of low pitch
      ii. a cutting-conveyor section having double helix blades, and
      iii. a conveying storage section having a single helix blade of
      pitch steeper than a blade of said cutting-conveyor section.

3. A soil fumigant injection apparatus comprising mounting means providing a mounting for said apparatus, said apparatus including
   1. auger means having an axial conduit and at least one exhaust orifice disposed at a lower portion thereof and communicating with said conduit
   2. means interconnected with said auger means for raising and lowering said auger means
   3. fumigant feed means
   4. coupling means providing communication between the axial conduit of said auger means and said fumigant feed means, said auger means comprising blades and having
      a. a tip section
      b. a cutting-conveyor section, and
      c. a conveyor storage section having a blade of steeper pitch than a blade of said cutting-conveyor section, and
   5. drive means adapted to rotate said auger in either direction.

4. An apparatus according to claim 3 wherein the tip section comprises a single helix blade of low pitch.

5. An apparatus according to claim 3 wherein said cutting-conveyor section comprises two helix blades 180° apart.

6. an apparatus according to claim 3 wherein said conveyor storage section is a single helix blade of steep pitch.

* * * * *